Feb. 11, 1958      J. A. REYNOLDS      2,823,316
CENTERING DEVICE FOR X-RAY APPARATUS
Filed Aug. 17, 1953
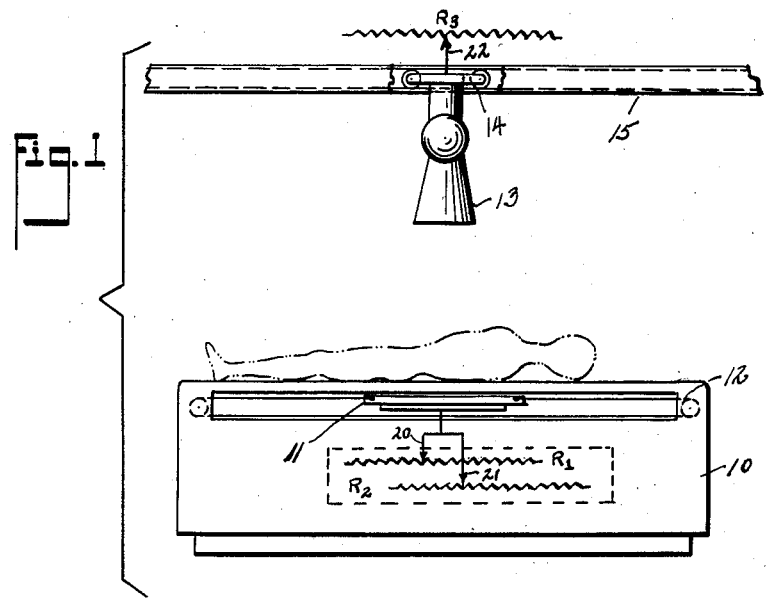
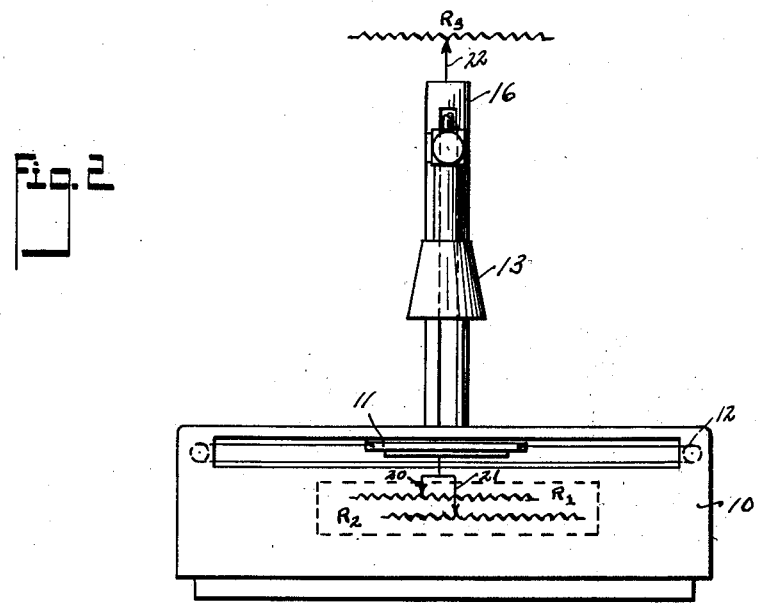
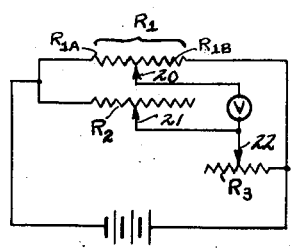
INVENTOR.
John A. Reynolds
BY
Attorneys United States Patent Office 2,823,316
Patented Feb. 11, 1958

2,823,316

CENTERING DEVICE FOR X-RAY APPARATUS

John A. Reynolds, White Plains, N. Y., assignor to Picker X-Ray Corporation, Waite Mfg. Div. Inc., Cleveland, Ohio, a corporation of Ohio Application August 17, 1953, Serial No. 374,540

6 Claims. (Cl. 250—58)

This invention relates to X-ray apparatus generally and more particularly to an apparatus for aligning several X-ray operative members which are independently movable relative to a support.

When X-ray apparatus is utilized for radiography it is desirable to assure alignment between the source of X-rays and the film before a radiographic exposure is made. The principal alignment relates to the centering of the primary beam with respect to the center of the film area to be exposed. In present day equipment, the sequence of taking a radiograph usually involves positioning the film in a Bucky carriage beneath the part to be radiographed. A great deal of care is exercised in positioning the Bucky carriage so that the center lines on the film cassette are properly disposed with respect to the part under observation. The Bucky carriage is then locked in place on the support and the X-ray tube is positioned adjacent the Bucky and centered so that the primary X-ray beam is aligned with the center lines on the film cassette. The alignment requires a large number of steps and usually involves a trail and error technique within the general area of alignment to accomplish the necessary centering.

Accordingly, it is the principal object of this invention to provide an apparatus which will efficiently enable the alignment and centering of several operative members which are independently movable relative to a support with a minimum number of steps.

Another object of this invention relates to the provision of an apparatus for indicating the relative position of several X-ray operative members which are independently movable relative to a support in order to signify the desired direction of movement for correct alignment.

Briefly, this invention contemplates the utilization in an X-ray apparatus having a support and a plurality of operative members which are independently movable relative to the support, of an electrical bridge circuit which can be adjusted to an electrical balance when the members occupy a predetermined position relative to each other. Movement of one of the members will establish a reference condition in the bridge circuit corresponding to the position of such member relative to the support and movement of the other member will adjust one branch in accordance with the position of the other member with respect to the support. The electrical condition of the bridge circuit is detected and visually indicated to signify the relative positions of the members.

In Fig. 1 of the drawings there is diagrammatically shown a ceiling mounted X-ray apparatus;

In Fig. 2 of the drawings there is diagrammatically shown a floor or rail mounted X-ray apparatus; and Fig. 3 of the drawings schematically shows an electrical circuit for detecting and indicating the relative positions of several independently movable members in the X-ray apparatus.

Referring now to Figs. 1 and 2 of the drawings there is shown an X-ray table 10 which supports a Bucky carriage 11 for longitudinal movement beneath the top surface thereof. The Bucky carriage is adapted to support a film cassette for positioning adjacent any selected portion of the subject by means of a pulley mounted cable arrangement designated generally at 12 in the drawings. The X-ray tube 13 is also supported for longitudinal movement relative to the table 10 so that it may be also positioned relative to the selected part of the subject and in alignment with the film cassette for radiographic exposure. In Fig. 1 the X-ray tube 13 is of the ceiling mounted type which is carried by a trolley 14 for movement along an overhead track 15. The tube in Fig. 2 is carried by a tube stand 16 which is in turn mounted for movement in a table carriage or on a lower rail for positioning along the table 10.

As hereinbefore noted, proper radiographic technique requires that the X-ray tube 13 be aligned and centered with respect to center lines in the film cassette to insure proper exposure of the part under observation. The arrangements which are diagrammatically illustrated in Figs. 1 and 2 of the drawings are merely exemplary embodiments and illustrate the type of apparatus wherein the film cassette is positioned by means of the Bucky carriage for alignment with the part to be exposed and the X-ray tube is then moved into position and centered with center lines on the film cassette.

Referring now to Fig. 3 of the drawings, there is shown an electrical circuit which is coupled to the apparatus to indicate when the tube 13 and film cassette are properly aligned and centered. The circuit is preferably in the form of an electrical bridge having two parallel paths with an adjustable potentiometer forming a branch in each path. Thus, one branch of the bridge is formed by the active part of the potentiometer R2 while two other branches of the bridge circuit are formed by the active parts R1A and R1B of the potentiometer R1. The active part of the potentiometer R3 forms an unknown branch which closes the bridge circuit. The circuit is shown connected to a direct current source of electrical energy and may be balanced by adjustment of the potentiometer resistances so that an equal amount of current passes through each path. In the preferred form, the contact arms 20 and 21 for the potentiometers R1 and R2 are shown coupled to the driving cable for the Bucky carriage 11 and are ganged for similar movement when the Bucky carriage is positioned longitudinally of the table 10. The contact arm 22 for the potentiometer R3 is similarly coupled to the X-ray tube supporting carriage 14 or 16 for movement when the carriage is positioned longitudinally of the table 10.

A suitable detector, which in Fig. 3 takes the form of a voltmeter V may be connected across the bridge circuit through the contact arms 20, 21 and 22 to detect the electrical condition of the bridge circuit and visually signify the adjustments of each of the potentiometers. Since the positions of the contact arms correspond to the positions of the operative members to which they are coupled, the indication will also signify the relative positions of the Bucky carriage 11 and the X-ray tube 13. The bridge circuit illustrated in Fig. 3 is basically a Wheatstone bridge type of arrangement, although other types of bridge circuits or variations may be utilized to accomplish similar results. In this arrangement, the potentiometers R2 and R1 are preferably of equal value so that when the Bucky carriage 11 is positioned, the two branches of the bridge circuit to the left remain equal in value and the branch to the right is adjusted to establish a reference condition in the bridge circuit corresponding to the position of the Bucky carriage relative to the table 10. Movement of the tube carriage will similarly position the contact arm 22 of potentiometer R3 and, when the active portion of R3 is equal to the active portion R1B, the tube 13 will be properly aligned with the film in the Bucky carriage and the bridge circuit will be balanced. The mathematical relationship between the values in the bridge circuit at balance is such that:

$$R3 = \left(\frac{R2}{R1A}\right) R1B$$

Thus, if the active portion of the potentiometer R2 and the adjacent branch R1A of the potentiometer R1 are equal in value, the bridge will be balanced when branch R3 is equal in value to the portion R1B of potentiometer R1.

It is readily apparent that the meter indication of the electrical condition of the bridge circuit may be continuous, thereby serving to guide the operator in the centering or aligning operation. A meter could be marked or otherwise made to provide an indication of the direction in which the tube carriage should be moved for alignment, thereby eliminating much of the trial and error technique which is inherent in conventional arrangements and which serve merely to indicate the attainment of a centered position. In the alternative, a conventional relay may be substituted in place of the meter to cause a signal light to be energized when the bridge circuit is balanced and thereby indicate the attainment of the centered relationship.

Thus, there has been provided a simple arrangement for aligning an X-ray tube and a radiographic film in centered relation with respect to the part under observation and with a minimum of operations. The arrangement also is capable of aiding the operator in guiding the centering or aligning operation.

I have shown and described what I consider to be the preferred embodiment of my invention along with suggested modified forms and, it will be obvious to those skilled in the art that, similar changes and modifications, particularly with respect to the type of bridge circuit and indicating device utilized, may be made without departing from the scope of my invention as described by the appended claims.

I claim:

1. In an X-ray apparatus having a support and a pair of operative members independently movable relative to the support and each other, an electrical bridge circuit having a plurality of branches adapted to be adjusted to an electrically balanced condition consequent upon the members occupying a predetermined position relative to each other, means actuated by movement of one of said members to adjust one of said branches to establish a reference condition in the bridge circuit corresponding to an attained position of said one member with respect to the support, means actuated by a movement of the other member for automatically adjusting another of said branches in accordance with said position of the other member with respect to the support, and means for visually indicating the electrical condition of the bridge circuit to determine the relative position of the members with respect to each other.

2. In an X-ray apparatus having a table and having a film carrier beneath the table and an X-ray source carrier above the table each independently movable relative to the table, a plurality of electrical impedances, means interconnecting said impedances to form independent branches of an electrical bridge circuit, means for connecting said bridge circuit to a source of electrical energy, said branch impedances being adjustable to obtain an electrically balanced condition in the bridge circuit consequent upon the source carrier occupying an aligned position relative to the film carrier, means actuated by movement of the film carrier for adjusting all but one of the impedance branches to establish a reference condition in the bridge circuit corresponding to the position of said film carrier relative to the support, other means actuated by movement of said source carrier for adjusting said one impedance branch in accordance with the position of said source carrier relative to the support, and means for detecting and indicating the electrical condition of the bridge circuit to signify the relative positions of the source carrier and the film carrier.

3. In an X-ray apparatus, a device for signifying the alignment of an X-ray tube with a radiographic film each of which is independently movable along a table and comprising, an electrical circuit adapted to be connected to a source of electrical energy, said circuit including a plurality of adjustable impedances interconnected to form parallel branches of an electrical bridge, means for adjusting selected branch impedances in accordance with the position of the film carrier to establish an electrical reference condition in the bridge, other means for adjusting other selected branch impedances in accordance with the position of the X-ray tube, each of said branch impedances coacting to balance the bridge circuit when the tube is aligned with the film carrier, and means connected across the parallel branches to detect the electrical condition in the bridge circuit.

4. The device of claim 3 wherein said last mentioned means includes a meter having a scale marked to visually indicate the relative positions of the film carrier and the tube.

5. The device of claim 3 wherein said first adjusting means includes a contact arm forming a portion of the interconnection and operatively coupled for movement with the film carrier, and wherein said other adjustable means includes a contact arm forming a portion of the interconnection and operatively coupled for movement with the X-ray tube, whereby the amount of the corresponding selected branch impedances active in the bridge circuit will vary respectively as the film carrier and tube are moved.

6. In an X-ray apparatus having a table with a film carrier beneath the table and an X-ray tube above the table and each independently movable along the table, a device for signifying the relative positions of the X-ray tube and the film carrier comprising, an electrical bridge circuit having two parallel paths adapted to be coupled to a source of electrical energy, a pair of adjustable resistances connected in series in each path, means actuated by movement of said film carrier to adjust all but one of said resistances and establish an electrical reference condition in the bridge circuit corresponding to the position of the film carrier, other means actuated by movement of the X-ray tube to adjust said one resistance to correspond to the position of the tube, and detecting means electrically coupling the series connection between the resistances in one path to the series connection between the resistances in the other path to signify the electrical condition in the bridge circuit and thereby indicate the relative positions of the film carrier and the X-ray tube.

References Cited in the file of this patent

UNITED STATES PATENTS

| 798,236 | Usener | Aug. 29, 1905 |
| 1,832,865 | Israel | Nov. 24, 1931 |
| 2,004,232 | Weed | June 11, 1935 |
| 2,120,729 | Chausse | June 14, 1938 |
| 2,529,054 | Smith | Nov. 7, 1950 |